US010030741B2

(12) United States Patent
Russo

(10) Patent No.: US 10,030,741 B2
(45) Date of Patent: Jul. 24, 2018

(54) CHAIN WITH ALTERNATING INSIDE LINK POSITION TO ENABLE NARROW LACING WITH IMPROVED NVH BEHAVIOR

(71) Applicant: BorgWarner Inc., Auburn Hills, MI (US)

(72) Inventor: Dean Russo, Dryden, NY (US)

(73) Assignee: BORGWARNER INC., Auburn Hills, MI (US)

( * ) Notice: Subject to any disclaimer, the term of this patent is extended or adjusted under 35 U.S.C. 154(b) by 59 days.

(21) Appl. No.: 14/910,765

(22) PCT Filed: Aug. 14, 2013

(86) PCT No.: PCT/US2013/054864
§ 371 (c)(1),
(2) Date: Feb. 8, 2016

(87) PCT Pub. No.: WO2015/023269
PCT Pub. Date: Feb. 19, 2015

(65) Prior Publication Data
US 2016/0195166 A1 Jul. 7, 2016

(51) Int. Cl.
*F16G 13/04* (2006.01)
*F16G 13/06* (2006.01)

(52) U.S. Cl.
CPC .............. *F16G 13/04* (2013.01); *F16G 13/06* (2013.01)

(58) Field of Classification Search
CPC .......... F16G 13/04; F16G 13/06; F16G 13/08; F16H 55/30; F16H 7/06
USPC .................................. 474/212, 213
See application file for complete search history.

(56) References Cited

U.S. PATENT DOCUMENTS

| 1,180,578 | A | * | 4/1916 | Eden | F16G 13/06 |
| | | | | | 305/202 |
| 4,010,656 | A | * | 3/1977 | Jeffrey | F16G 13/06 |
| | | | | | 474/215 |
| 4,759,740 | A | * | 7/1988 | Cradduck | F16G 13/04 |
| | | | | | 474/212 |
| 4,906,224 | A | * | 3/1990 | Reber | F16G 13/04 |
| | | | | | 474/213 |
| 5,800,301 | A | * | 9/1998 | Anderson | F16G 13/06 |
| | | | | | 474/157 |

(Continued)

FOREIGN PATENT DOCUMENTS

| JP | H11201238 A | 7/1999 |
| JP | 2003083398 A | 3/2003 |

(Continued)

OTHER PUBLICATIONS

International Search Report for PCT/US2013/054864 dated May 20, 2014.
Extended Search Report for PCT/US2013/054864 dated May 4, 2017.

*Primary Examiner* — Henry Y Liu
(74) *Attorney, Agent, or Firm* — Brown & Michaels, PC

(57) ABSTRACT

A narrow chain with alternating inside link positions in a 3×1 lacing arrangement provides improved noise-vibration-harshness (NVH) characteristics relative to conventional narrow-laced chains in an oil pump drive application. The two inside links are offset with respect to each other, with one of the two being aligned with the two guide plates in the guide row. The chain design is preferably used as an oil pump drive chain or in other auxiliary drive applications.

12 Claims, 7 Drawing Sheets

(56) References Cited

U.S. PATENT DOCUMENTS

| | | | |
|---|---|---|---|
| 5,857,933 A * | 1/1999 | Patton | F16G 13/04 474/213 |
| 5,989,140 A * | 11/1999 | Ichikawa | F16H 7/06 474/148 |
| 5,989,141 A * | 11/1999 | Kozakura | F16G 13/04 474/206 |
| 6,186,920 B1 * | 2/2001 | Reber | F16G 13/04 474/157 |
| 6,267,701 B1 * | 7/2001 | Mott | F01L 1/022 474/148 |
| 6,287,229 B2 * | 9/2001 | Reber | 474/157 |
| 6,393,820 B1 * | 5/2002 | Varnam | B66F 9/08 474/212 |
| 6,450,910 B1 * | 9/2002 | Matsumoto | F16G 13/04 474/206 |
| 6,450,911 B2 * | 9/2002 | Saitou | F16G 13/04 474/213 |
| 6,500,084 B2 * | 12/2002 | Wigsten | F16H 55/30 474/152 |
| 6,623,392 B2 * | 9/2003 | Reber | F16G 13/04 474/152 |
| 6,685,589 B2 * | 2/2004 | Horie | F16G 13/04 474/212 |
| 7,056,248 B2 * | 6/2006 | Butterfield | F16G 13/04 474/212 |
| 7,059,985 B2 * | 6/2006 | Markley | F16H 55/30 474/206 |
| 7,094,170 B2 * | 8/2006 | Young | F16G 13/04 474/153 |
| 7,404,778 B2 * | 7/2008 | Butterfield | F16G 13/04 474/212 |
| 7,476,170 B2 * | 1/2009 | Ogo | F16G 13/04 474/206 |
| 7,497,795 B2 * | 3/2009 | Tohara | F16G 13/04 474/212 |
| 7,931,405 B2 * | 4/2011 | Fujiwara | C23C 8/22 384/276 |
| 7,942,772 B2 * | 5/2011 | Sonoda | F16G 13/04 474/206 |
| 8,146,340 B2 * | 4/2012 | Shimada | F16G 13/04 474/206 |
| 8,602,932 B2 * | 12/2013 | Motoshima | F16G 13/04 474/212 |
| 8,695,320 B2 * | 4/2014 | Scolari | F16G 13/20 198/784 |
| 8,968,132 B2 * | 3/2015 | Miyanaga | F16G 13/04 474/206 |
| 2001/0006918 A1 * | 7/2001 | Saitou | F16G 13/04 474/212 |
| 2002/0006843 A1 * | 1/2002 | Reber | F16G 13/04 474/213 |
| 2002/0025870 A1 * | 2/2002 | Kozakura | F16G 13/04 474/214 |
| 2002/0098934 A1 * | 7/2002 | Wigsten | F16H 55/30 474/212 |
| 2002/0132690 A1 | 9/2002 | Suzuki et al. | |
| 2003/0017896 A1 * | 1/2003 | Markley | F16H 55/30 474/157 |
| 2003/0176252 A1 * | 9/2003 | Tsujii | F16G 13/04 474/213 |
| 2005/0049097 A1 * | 3/2005 | Butterfield | F16G 13/04 474/206 |
| 2005/0049098 A1 * | 3/2005 | Butterfield | F16G 13/04 474/212 |
| 2006/0094551 A1 * | 5/2006 | Tohara | F16G 13/04 474/212 |
| 2006/0105872 A1 * | 5/2006 | Tohara | F16G 13/04 474/212 |
| 2007/0161445 A1 * | 7/2007 | Nagao | F16G 13/04 474/212 |
| 2007/0197328 A1 * | 8/2007 | Junig | F16G 13/04 474/213 |
| 2007/0287563 A1 * | 12/2007 | Butterfield | F16G 13/04 474/212 |
| 2008/0020883 A1 * | 1/2008 | Sporrer | F16G 13/02 474/213 |
| 2008/0032840 A1 * | 2/2008 | Hirschmann | F16G 13/04 474/212 |
| 2008/0227575 A1 * | 9/2008 | Fujiwara | F16G 13/04 474/212 |
| 2008/0300079 A1 * | 12/2008 | Botez | F16G 13/04 474/213 |
| 2009/0000852 A1 * | 1/2009 | Paul | F16H 7/06 180/373 |
| 2009/0054187 A1 * | 2/2009 | Pflug | F16G 13/04 474/141 |
| 2009/0186731 A1 * | 7/2009 | Tohara | F16G 13/04 474/213 |
| 2009/0186732 A1 * | 7/2009 | Tohara | F16G 13/04 474/213 |
| 2009/0239697 A1 * | 9/2009 | Sakamoto | F16G 13/04 474/213 |
| 2010/0216580 A1 * | 8/2010 | Kabai | F16G 13/04 474/207 |
| 2010/0307128 A1 * | 12/2010 | Shimada | F16G 13/06 59/85 |
| 2011/0009221 A1 * | 1/2011 | Ogo | F01L 1/02 474/213 |
| 2011/0177899 A1 | 7/2011 | Botez et al. | |
| 2011/0230289 A1 * | 9/2011 | Schuseil | F16G 13/04 474/206 |
| 2011/0230290 A1 * | 9/2011 | Belmer | F16G 13/04 474/212 |
| 2011/0245002 A1 * | 10/2011 | Young | F16H 55/30 474/157 |
| 2011/0287883 A1 * | 11/2011 | Ritz | F16G 13/08 474/213 |
| 2012/0157252 A1 * | 6/2012 | Yoshida | F16G 13/08 474/213 |
| 2012/0165144 A1 * | 6/2012 | Dogimont | F16G 13/04 474/212 |
| 2013/0203538 A1 * | 8/2013 | Miyanaga | F16G 13/04 474/213 |
| 2013/0267364 A1 * | 10/2013 | Motoshima | F16G 13/04 474/213 |
| 2014/0141914 A1 * | 5/2014 | Tanaka | F16G 13/08 474/214 |

FOREIGN PATENT DOCUMENTS

| | | |
|---|---|---|
| JP | 2008223859 A | 9/2008 |
| JP | 2012062920 A | 3/2012 |
| KR | 20060047559 A | 5/2006 |

* cited by examiner

CHAIN WITH ALTERNATING INSIDE LINK POSITION TO ENABLE NARROW LACING WITH IMPROVED NVH BEHAVIOR

BACKGROUND OF THE INVENTION

Field of the Invention

The invention pertains to the field of chains. More particularly, the invention pertains to a chain with alternating inside link positions.

Description of Related Art

Ultra-light chain lacings have been employed previously to create chains with good wear and strengths in a narrower package than would otherwise be possible with a more traditional chain lacing having interleaved links. These chains, however, have been known to elevate operational noise levels as a result of the every-other-pitch contact with the sprocket.

U.S. Pat. No. 690,318, entitled "Drive Chain" and issued to Renold on Dec. 31, 1901, discloses a drive chain having guide links with alternating rows of thick inside links.

U.S. Pat. No. 1,270,460, entitled "Chain" and issued to Taylor on Jun. 25, 1918, discloses a chain having guide links with alternating rows of links. The inside links are composite links which include hard and soft links joined together.

U.S. Pat. No. 6,186,920, entitled "Short Pitch Tooth Chain" and issued to Reber on Feb. 13, 2001, discloses a short pitch tooth chain that reduces the level of impact noise generated during operation. The chain includes a first tension link, a guide link, a double-toed link, and a second tension link.

Japanese Patent Publication No. 2012-062920, entitled "Chain" by Yoshiki et al. and published Mar. 29, 2012, discloses a first guide link plate in a first link row of the chain on a first side and a first inner link plate inside the first guide. In the second link row, a second guide link plate is disposed on the other side or second side and a second inner link plate inside the second guide link plate. The links may alternately be connected and braided together by connecting pins.

The above-mentioned patents are hereby incorporated by reference herein.

SUMMARY OF THE INVENTION

A narrow chain with alternating inside link positions in a 3×1 lacing arrangement provides improved noise-vibration-harshness (NVH) characteristics relative to conventional narrow-laced chains in an oil pump drive application. The two inside links are offset with respect to each other, with one of the two being aligned with the two guide plates in the guide row. The chain design is preferably used as an oil pump drive chain or in other auxiliary drive applications.

In some embodiments, a chain includes guide link plates, non-guide link plates, and pins. Each link plate has a pair of pin apertures. Each pin passing sequentially through an aperture of a first guide link plate, an aperture of a first non-guide link plate, an aperture of a second non-guide link plate, and an aperture of a second guide link plate. The pins holding the link plates together through the pin apertures to form interleaved sets of links of alternating guide rows and non-guide rows. The first guide link plates, the first non-guide link plates, and the second guide link plates are in the guide rows, and the second non-guide link plates are in the non-guide rows.

In some embodiments, a chain includes a plurality of inner links, a plurality of outer links, and a plurality of pins. Each of the links has a pair of apertures. The links are arranged in alternating guide rows and non-guide rows. Each guide row includes a first inner link, a first outer link, and a second outer link. The first outer link is adjacent the first inner link. The non-guide row includes a second inner link adjacent the first inner link and the second outer link. Each pin passes through one of the apertures of one of the first outer links, one of the apertures of one of the first inner links, one of the apertures of one of the second inner links, and one of the apertures of one of the second outer links.

DETAILED DESCRIPTION OF THE INVENTION

A 3×1 chain with alternating inside link positions enables a narrow lacing with improved noise-vibration-harshness (NVH) characteristics relative to conventional narrow-laced chains. The chain preferably includes exactly one inside link and two outside guide links in each guide row and exactly one inside link in each non-guide row within the chain assembly in order to maintain conventional sprocket engagement, thus allowing a reduced chain package size and component count.

In a preferred embodiment, a chain includes guide link plates, non-guide link plates, and pins. Each link plate has a pair of pin apertures. Each pin passing sequentially through an aperture of a first guide link plate, an aperture of a first non-guide link plate, an aperture of a second non-guide link plate, and an aperture of a second guide link plate. The pins holding the link plates together through the pin apertures to form interleaved sets of links of alternating guide rows and non-guide rows. The first guide link plates, the first non-guide link plates, and the second guide link plates are in the guide rows, and the second non-guide link plates are in the non-guide rows.

The chain is preferably the type of chain referred to as a silent chain or an inverted tooth chain. A chain with alternating inside link positions is especially applicable to auxiliary drives, such as oil pump systems, which do not have a need for high strength capability, but may be used for any drive with lower loads than a typical timing drive, such as, for example, a pump drive or a shaft drive. In some embodiments, the chain is an oil pump drive chain.

In some automotive applications, a single sprocket may contain two rows of teeth to drive both a camshaft drive chain and an auxiliary drive chain. In such cases, it may be advantageous to have both chains be capable of operating on the same sprocket tooth profile, which may be formed onto the same sprocket using hobbing or powdered metal technology. The requirements for the auxiliary drive chain may be much lower than the requirements for the camshaft drive chain, and a chain with alternating inside link positions allows the option of a narrower, less costly product operating on the same profile, thereby reducing both the total sprocket cost and the total chain cost.

Figure 1:
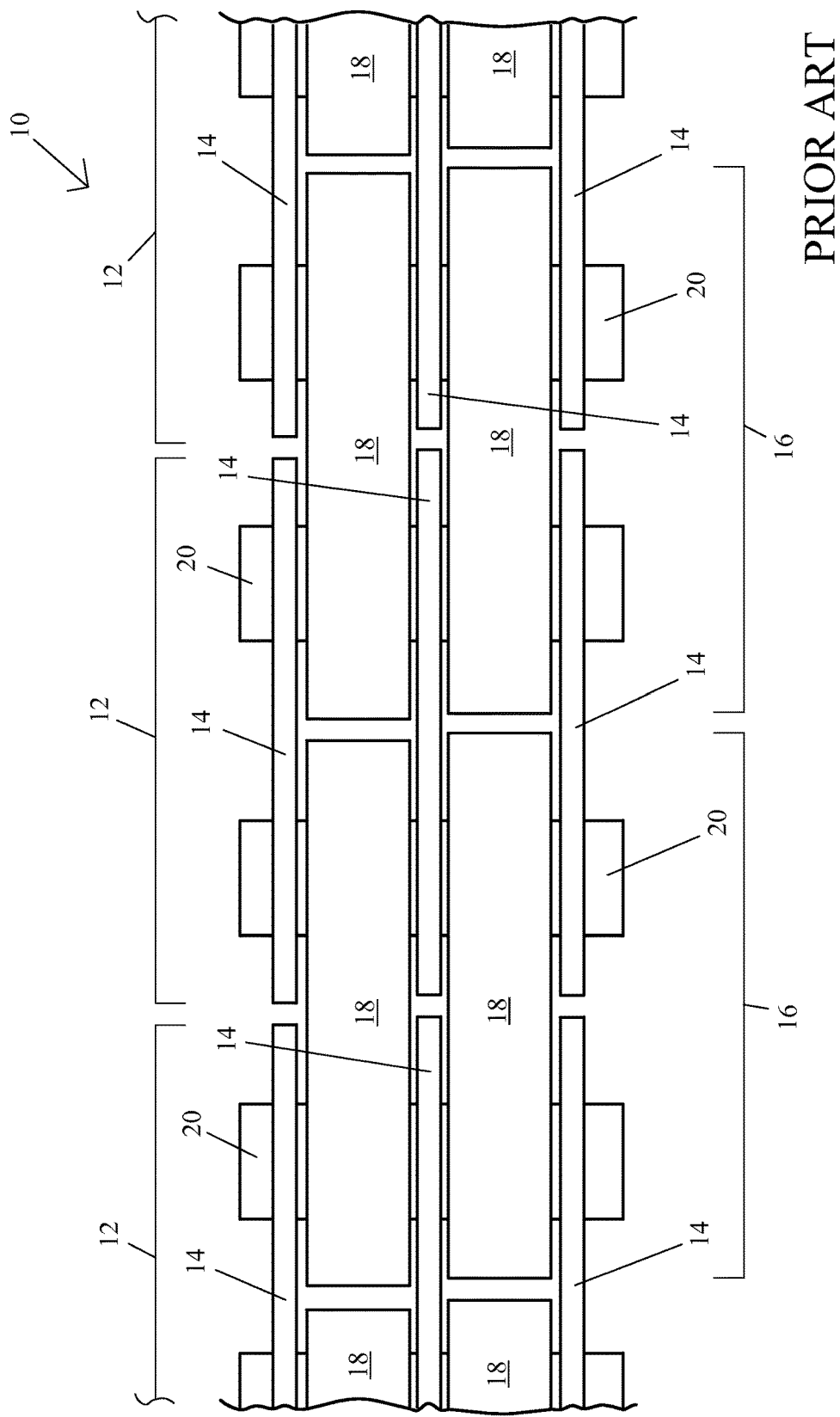
FIG. 1 shows a prior art chain with a 3×2 lacing of the link plates.

As such, a chain of lower cost and complexity than a 3×2 inverted tooth chain may be used as an auxiliary drive chain, such as an oil pump drive chain. A prior art 3×2 chain lacing is shown in FIG. 1. The chain 10 includes guide rows 12 of three guide link plates 14 and non-guide rows 16 of two non-guide link plates 18 held together by pins 20. The guide rows 12 are offset from the non-guide rows 16, and the guide link plates 14 and the non-guide link plates 18 alternatingly laced on each pin 20.

Figure 2:
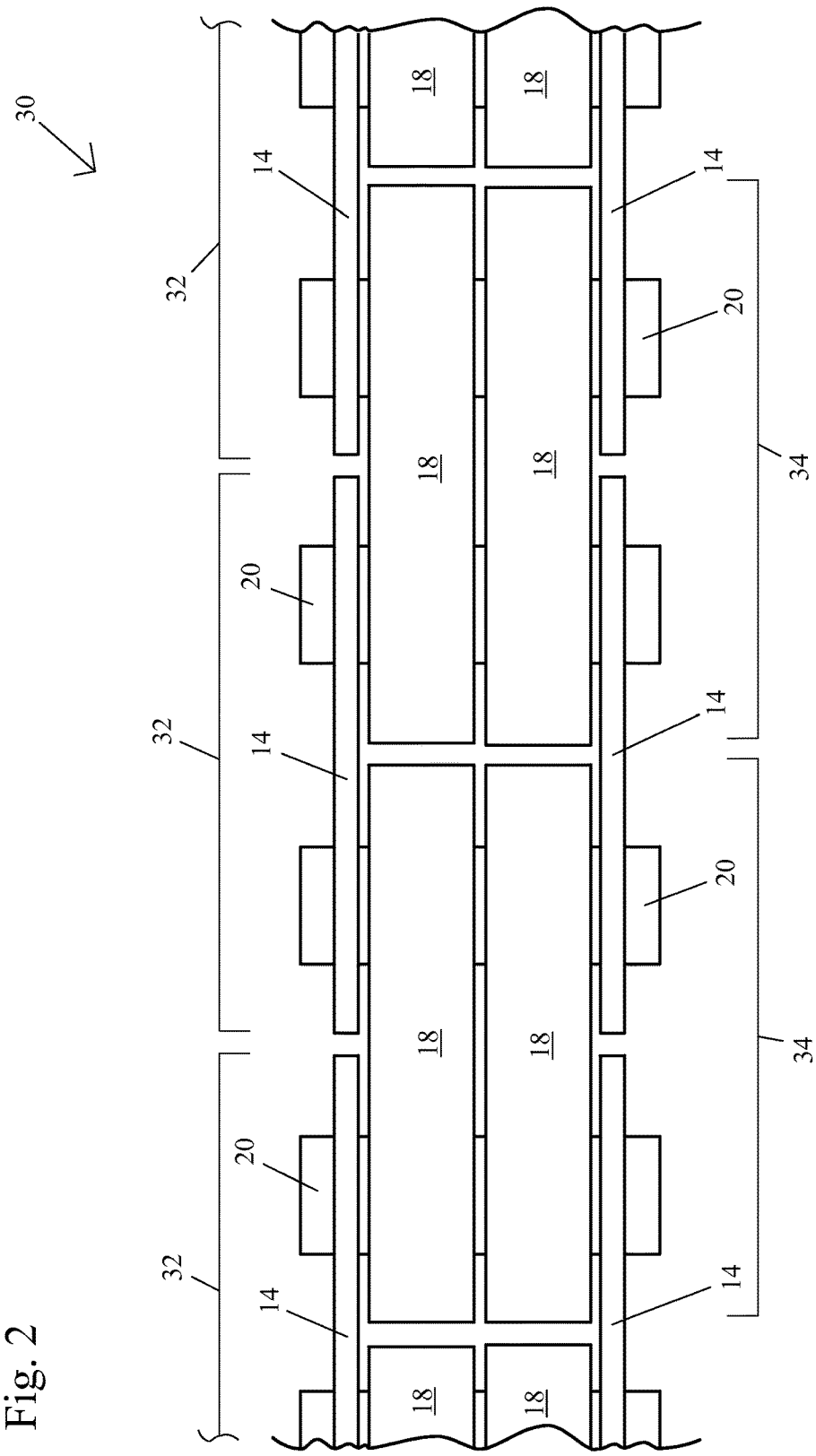
FIG. 2 shows a prior art chain with a 2×2 lacing of the link plates.

A 2×2 inverted tooth chain design lacks the interior guide row and hence is a simpler and narrower design than a 3×2 chain lacing. A prior art 2×2 chain lacing is shown in FIG. 2. The chain 30 includes guide rows 32 of two guide link plates 14 and non-guide rows 34 of two non-guide link plates 18 held together by pins 20. The guide rows 32 are offset from the non-guide rows 34, and the guide link plates 14 are located on the ends with the non-guide link plates 18 being on the inside and adjacent to each other.

Figure 3:
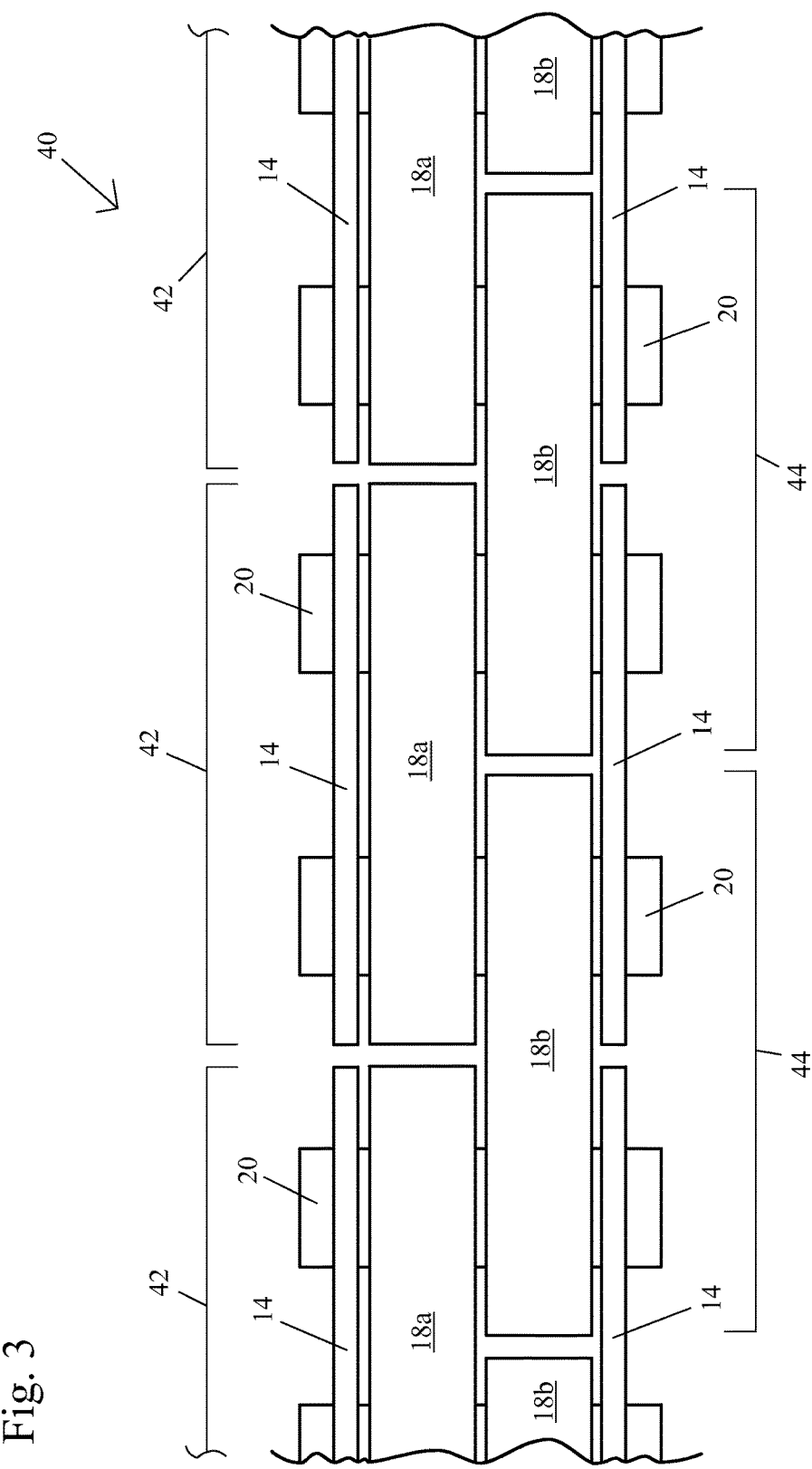
FIG. 3 shows a chain with a 3×1 lacing of the link plates in an embodiment of the present invention.

A 3×1 chain design with alternating inside link positions also lacks the interior guide plates and hence is a simpler and narrower design than a 3×2 chain lacing. A 3×1 chain lacing is shown in FIG. 3. The chain 40 with alternating inside link positions includes guide rows 42 of two guide link plates 14 and one non-guide link plate 18a and non-guide rows 44 of one non-guide link plate 18b held together by pins 20. The guide rows 42 are offset from the non-guide rows 44, and the guide link plates 14 are located on the ends with the non-guide link plates 18a, 18b being on the inside and adjacent but offset with respect to each other.

Figure 4:
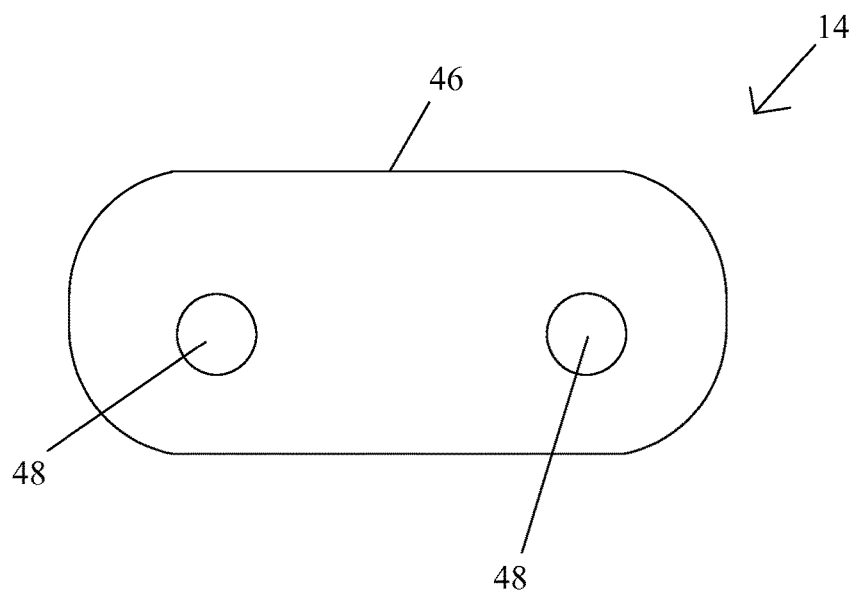
FIG. 4 shows a side view of a guide link plate in an embodiment of the present invention.

FIG. 4 shows a side view of a guide link plate. The guide link plate 14 typically has a profile 46 that lacks teeth or a notch, but many different profiles may be used within the spirit of the present invention, since the guide link plate 14 does not engage the sprocket. The two guide link plate apertures 48 allow the guide link plate 14 to be laced on pins as part of a chain.

Figure 5:
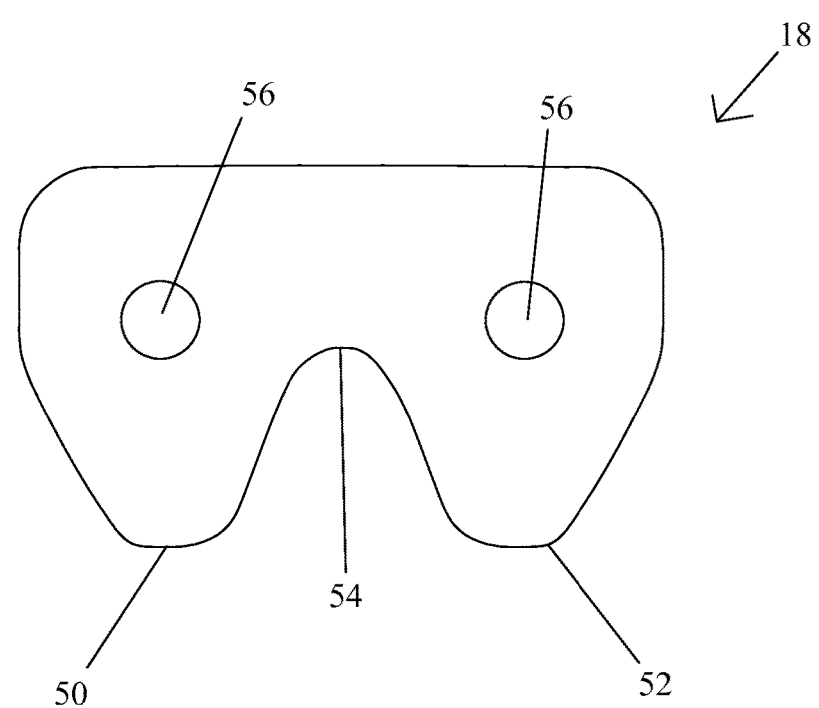
FIG. 5 shows a side view of a non-guide link plate in an embodiment of the present invention.

FIG. 5 shows a side view of a non-guide link plate. The non-guide link plate 18 generally has a flat top and a pair of teeth 50, 52 separated by a notch 54 to engage a sprocket, but many different variations to this general profile may be used within the spirit of the present invention. The two non-guide link plate apertures 56 allow the non-guide link plate 18 to be laced on pins as part of a chain.

In a preferred embodiment, the guide link plates all have the same profile and the pins all have the same size and shape. In alternative embodiments, the guide link plates may have different profiles.

The non-guide link plates are preferably all the same type of link plate. In a preferred embodiment, the non-guide link plates are all inverted tooth link plates. In a preferred embodiment, the inverted tooth link plates in the chain all have the same profile. In alternative embodiments, the inverted tooth link plates may have different profiles.

Comparative motorized NVH testing was done on three different oil pump drive chain designs having the same guide plate part, inverted tooth link plate part, and pin part and differing only in the lacing as a 3×2, a 2×2, and a 3×1 as shown in FIG. 1, FIG. 2, and FIG. 3, respectively. A Mazda 2.0 L I4 4V engine was used and testing was done over a range of engine speeds of 600 to 5000 revolutions per minute (RPMs). Operating noise level was collected and compared across the range of 600 to 5000 RPM at half pitch frequency, pitch frequency, second harmonic, third harmonic, fourth harmonic, and fifth harmonic.

Figure 6:
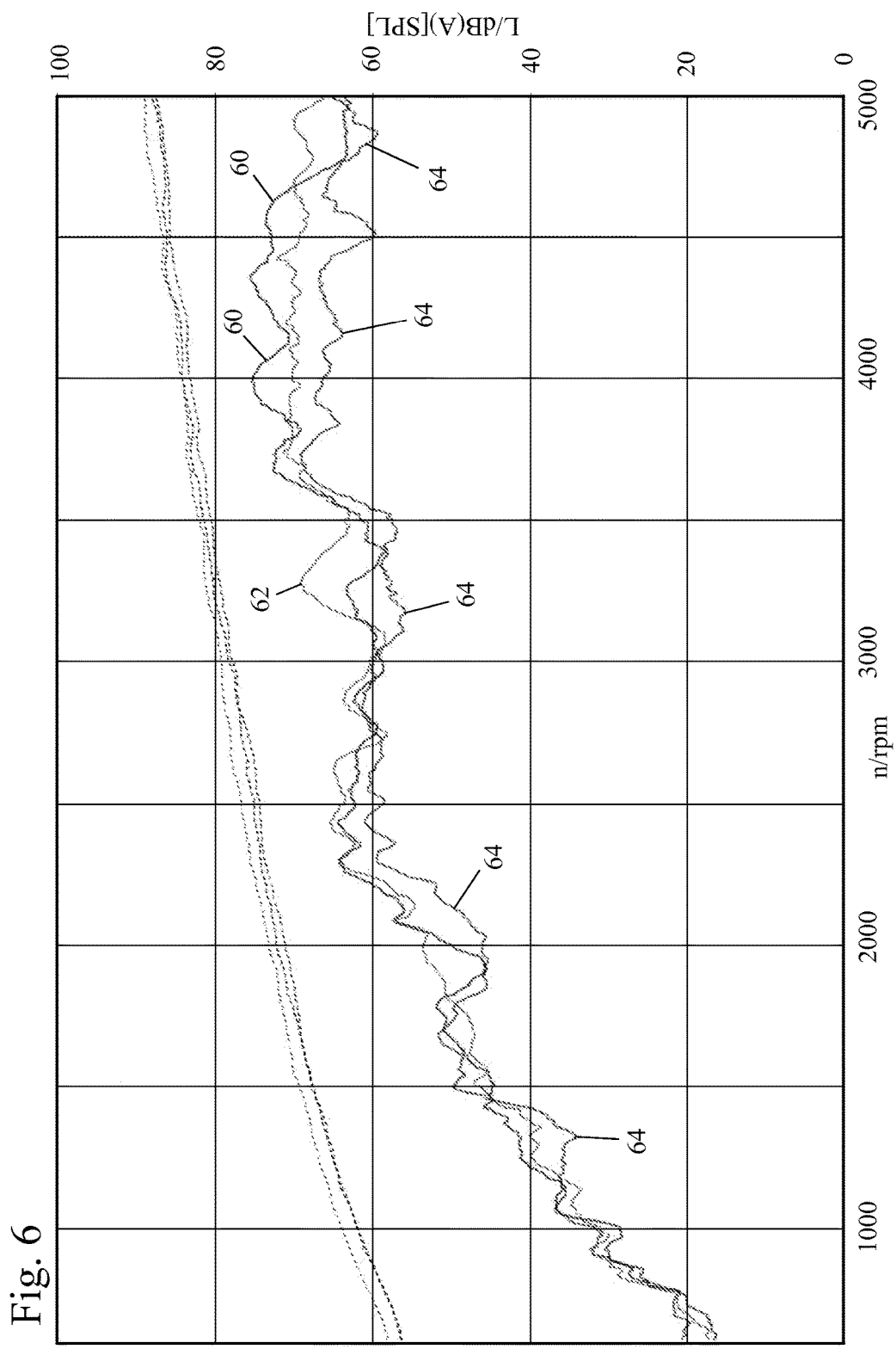
FIG. 6 shows NVH results at pitch frequency.
Figure 7:
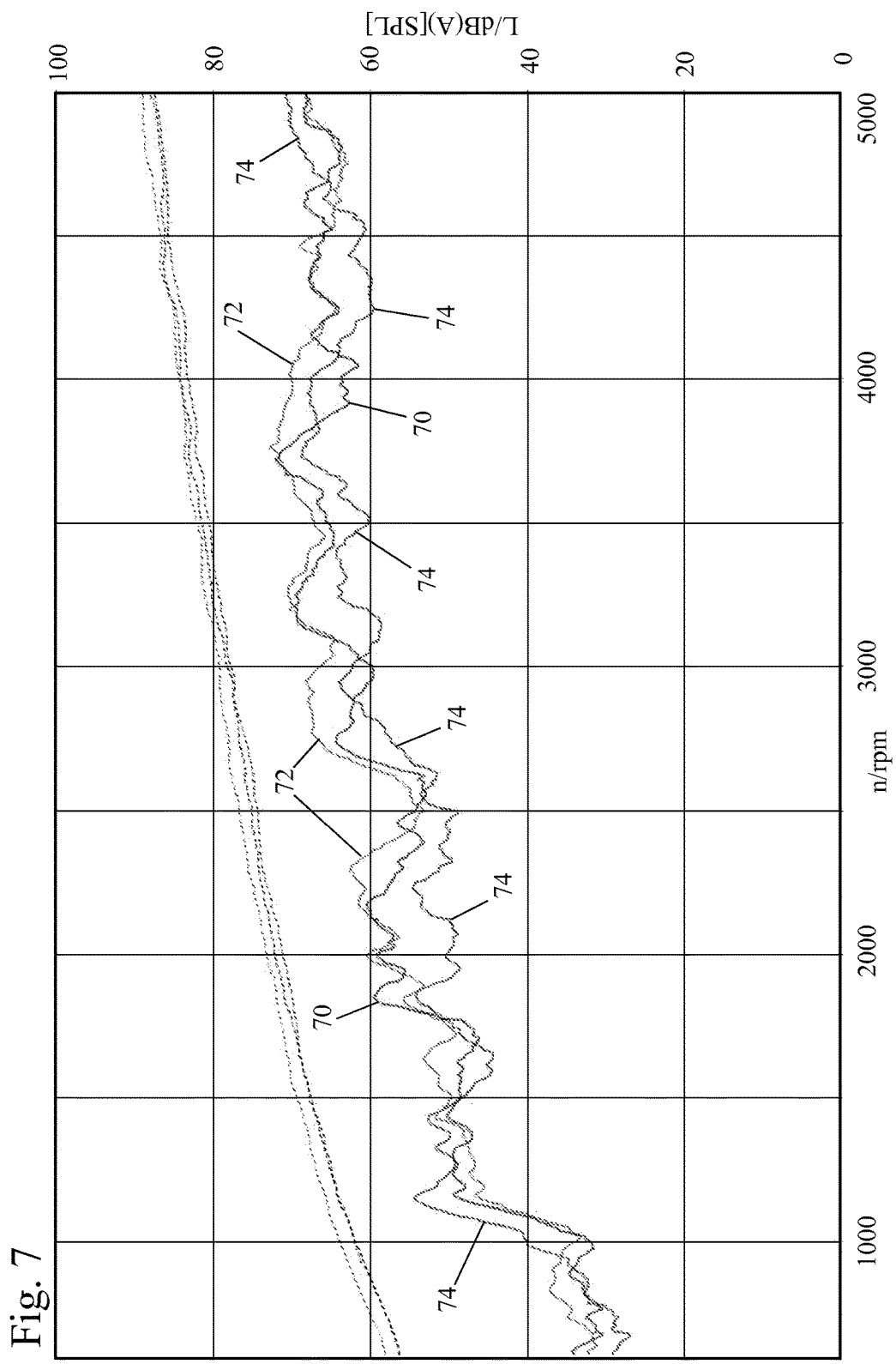
FIG. 7 shows NVH results at 2× pitch frequency.
Figure 8:
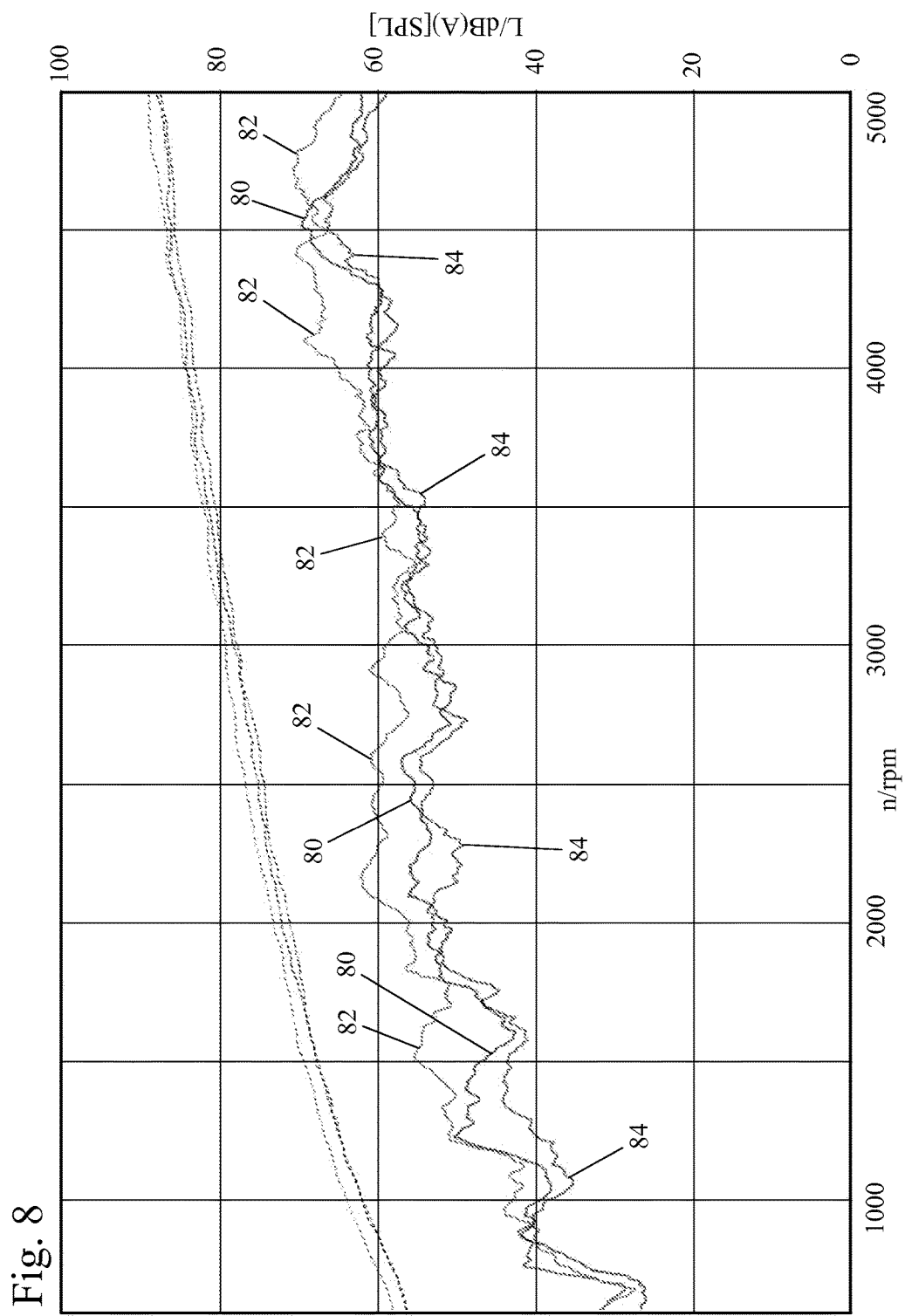
FIG. 8 shows NVH results at 3× pitch frequency.

The full NVH results for the 3×2 lacing, the 2×2 lacing, and the 3×1 lacing for pitch frequency, 2× pitch frequency, and 3× pitch frequency are shown in FIG. 6, FIG. 7, and FIG. 8, respectively. FIG. 6 shows the 3×2 chain noise level 60, the 2×2 chain noise level 62, and the 3×1 chain noise level 64 at pitch frequency. FIG. 7 shows the 3×2 chain noise level 70, the 2×2 chain noise level 72, and the 3×1 chain noise level 74 at 2× pitch frequency. FIG. 8 shows the 3×2 chain noise level 80, the 2×2 chain noise level 82, and the 3×1 chain noise level 84 at 3× pitch frequency.

The 2×2 chain had noise levels similar to the 3×2 design at half pitch frequency, pitch frequency, second harmonic, and fourth harmonic but had higher noise levels at third harmonic and fifth harmonic. The 2×2 design noise level 82 was most noticeably higher for the third harmonic in the ranges of 1500-3000 RPM, 4000-4300 RPM, and 4700-5000 RPM (see FIG. 8). The 2×2 design noise level was most noticeably higher for the fifth harmonic across the entire range of 700-3100 RPM.

In contrast, the 3×1 chain had noise levels similar to the 3×2 at half pitch frequency, third harmonic, fourth harmonic, and fifth harmonic and had lower noise levels at pitch frequency and second harmonic. The 3×1 design noise level 64 was most noticeably lower at pitch frequency in the ranges of 2000-2700 RPM and 3800-4600 RPM (see FIG. 6). The 3×1 design noise level 74 was most noticeably lower for the second harmonic in the ranges of 1900-2500 RPM, 3100-3700 RPM, and 4200-4500 RPM (see FIG. 7). A goal of the 3×1 lacing was to obtain the noise level of the 3×2 lacing with a narrower chain design, but the 3×1 lacing unexpectedly actually had lower noise levels than the 3×2 chain, in contrast to the 2×2 lacing, which elevated all frequencies due to the alternating pitch contact. The Table shows range-average levels of noise across the entire frequency range tested.

TABLE

NVH Results

| Average Noise (dBA) | Pitch Frequency | 2x Pitch Frequency | 3x Pitch Frequency |
| --- | --- | --- | --- |
| 3 × 2 Lacing | 67.5 | 64 | 59.5 |
| 2 × 2 Lacing | 65.8 | 65.6 | 63.1 |
| 3 × 1 Lacing | 61.5 | 62.4 | 58 |

In some embodiments, good control of the chain path and vibration may be desired or required, as the asymmetric design of the chain with alternating inside link positions may otherwise cause the chain path to wander axially.

Although thinner links may be used in a conventional interleaved lacing arrangement to achieve the same chain width as a chain with alternating inside link positions, such conventional lacing would have a higher parts count and subsequent cost.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain comprising:
a plurality of guide link plates and a plurality of non-guide link plates, each link plate having a pair of pin apertures; and
a plurality of pins, each pin passing sequentially through an aperture of a first guide link plate, an aperture of a first non-guide link plate, an aperture of a second non-guide link plate, and an aperture of a second guide link plate, the pins holding the link plates together through the pin apertures to form a plurality of interleaved sets of links of alternating guide rows and non-guide rows, the first guide link plates, the first non-guide link plates, and the second guide link plates being in the guide rows and the second non-guide link plates being in the non-guide rows, wherein the first guide link plate is adjacent the first non-guide link plate and the chain is asymmetric about a centerline and across a width of the chain, such that on one side of the centerline, in the guide row are the first guide link plate, and the first non-guide link plate and on an opposite side of the centerline is the second guide link plate in the guide row and the second non-guide link plate in the non-guide row.

2. The chain of claim 1, wherein the non-guide link plates are inverted tooth link plates.

3. The chain of claim 1, wherein the chain is an auxiliary chain.

4. The chain of claim 1, wherein the chain is an oil pump drive chain.

5. A chain comprising:
a plurality of inner links and a plurality of outer links, each of the links having a pair of apertures, the links being arranged in alternating guide rows and non-guide rows, each guide row comprising a first inner link, a first outer link, and a second outer link, the first outer link being adjacent the first inner link, the non-guide row comprising a second inner link adjacent the first inner link and the second outer link; and
a plurality of pins, each pin passing through one of the apertures of one of the first outer links, one of the apertures of one of the first inner links, one of the apertures of one of the second inner links, and one of the apertures of one of the second outer links.

6. The chain of claim 5, wherein the inner links are inverted tooth link plates.

7. The chain of claim 5, wherein the chain is an auxiliary chain.

8. The chain of claim 5, wherein the chain is an oil pump drive chain.

9. A chain comprising:
a plurality of guide link plates and a plurality of non-guide link plates, each link plate having a pair of pin apertures; and
a plurality of pins, each pin passing sequentially through an aperture of a first guide link plate, an aperture of a first non-guide link plate, an aperture of a second non-guide link plate, and an aperture of a second guide link plate, the pins holding the link plates together through the pin apertures to form a plurality of interleaved sets of links of alternating guide rows and non-guide rows, each guide row consisting of the first guide link plate, the first non-guide link plate, and the second guide link plate and each non-guide row consisting of the second non-guide link plate.

10. The chain of claim 9, wherein the inner links are inverted tooth link plates.

11. The chain of claim 9, wherein the chain is an auxiliary chain.

12. The chain of claim 9, wherein the chain is an oil pump drive chain.

* * * * *